United States Patent
Wittig et al.

[11] Patent Number: 6,042,296
[45] Date of Patent: Mar. 28, 2000

[54] SNAP-IN FASTENER FOR PANELS

[75] Inventors: J. Michael Wittig, West Chester; William R. Frame, Brookhaven, both of Pa.; William A. Wiedmann, Southbend, Ind.; Ralph Ulisse, Glassboro, N.J.

[73] Assignee: Southco, Inc., Concordville, Pa.

[21] Appl. No.: 09/033,890

[22] Filed: Mar. 3, 1998

Related U.S. Application Data

[63] Continuation-in-part of application No. 08/707,535, Sep. 4, 1996, Pat. No. 5,758,987, which is a continuation-in-part of application No. 08/529,746, Sep. 18, 1995, abandoned.

[51] Int. Cl.[7] ............................................. F16B 7/00
[52] U.S. Cl. .................... 403/298; 403/326; 403/397; 403/DIG. 10; 24/297; 24/453; 411/509; 411/913
[58] Field of Search ................................. 403/298, 408.1, 403/326, 327, 329, 397, 396, 385, 384, DIG. 10, DIG. 11, DIG. 14; 24/297, 453; 411/508, 509, 510, 913

[56] References Cited

U.S. PATENT DOCUMENTS

| | | |
|---|---|---|
| 2,041,336 | 5/1936 | Hall ........................................ 24/453 X |
| 3,651,545 | 3/1972 | Hara . |
| 3,811,154 | 5/1974 | Lindeman et al. . |
| 3,822,053 | 7/1974 | Daily . |
| 3,841,674 | 10/1974 | Bisbing et al. . |
| 3,842,709 | 10/1974 | Fugua . |
| 3,850,464 | 11/1974 | Bisbing et al. . |
| 3,860,999 | 1/1975 | Meyer . |
| 3,939,752 | 2/1976 | Koscik . |
| 3,988,808 | 11/1976 | Poe et al. ............................. 411/509 X |
| 4,014,520 | 3/1977 | Walters . |
| 4,159,592 | 7/1979 | Gabriel . |
| 4,176,428 | 12/1979 | Kimura ................................... 411/509 |
| 4,477,058 | 10/1984 | Lowery . |
| 4,524,494 | 6/1985 | Sato et al. ............................ 24/297 X |
| 4,540,160 | 9/1985 | Zanavich et al. . |
| 4,644,614 | 2/1987 | Mizusawa . |
| 4,652,192 | 3/1987 | Schaller . |
| 4,681,288 | 7/1987 | Nakamura ............................. 24/453 X |
| 4,691,897 | 9/1987 | Frush . |
| 4,716,633 | 1/1988 | Rizo ......................................... 24/453 |
| 4,723,760 | 2/1988 | O'Sullivan . |
| 4,778,320 | 10/1988 | Nakama ................................. 411/509 |
| 4,784,550 | 11/1988 | Wollar . |
| 4,927,287 | 5/1990 | Ohkawa et al. ..................... 403/408.1 |
| 5,120,025 | 6/1992 | D'Avanzo . |
| 5,134,752 | 8/1992 | Vickers . |
| 5,150,885 | 9/1992 | Leone . |
| 5,158,329 | 10/1992 | Schlack . |
| 5,161,783 | 11/1992 | German . |
| 5,372,354 | 12/1994 | Cacicedo . |
| 5,850,676 | 12/1998 | Takahashi et al. .................. 411/508 X |

FOREIGN PATENT DOCUMENTS

| | | |
|---|---|---|
| 288161 | 2/1964 | Australia . |
| 454253 | 5/1971 | Australia . |
| 639108 | 6/1990 | Australia . |
| 1098291 | 3/1981 | Canada .................................. 411/509 |
| 0519856 | 12/1992 | European Pat. Off. . |
| 2233884 | 1/1975 | France . |
| 1578381 | 11/1980 | United Kingdom . |
| 2111579 | 7/1983 | United Kingdom . |

OTHER PUBLICATIONS

Catalog pages (Micro Plastics, Inc., Flippin, Arkansas) pp. 15, 17, 18 and 24 (1993).

Solutions By Design (ITW Fastex Marketing Department, Des Plaines, Illinois) pp. 1–37 (1997).

*Primary Examiner*—Terry Lee Melius
*Assistant Examiner*—William L. Miller
*Attorney, Agent, or Firm*—Paul & Paul

[57] ABSTRACT

A fastener connects panel members in a flush position. The fastener includes a pair of connecting members which are snap-fit within apertures provided within each of the panel members for securing the panel members together. The fastener also disconnects the panel members when secured together. For this purpose, at least one of the connecting members is removable from the panel member aperture to disconnect the panel members. The fastener allows the panels to be assembled together and disassembled quickly and with little or no tooling.

17 Claims, 10 Drawing Sheets

_Fig. 16_

_Fig. 17_

_Fig. 18_

SNAP-IN FASTENER FOR PANELS

CROSS-REFERENCE TO RELATED APPLICATIONS

This application is a continuation-in-part of U.S. application Ser. No. 08/707,535 filed Sep. 4, 1996, now U.S. Pat. No. 5,758,987, issued Jun. 2, 1998, which is a continuation-in-part of U.S. application Ser. No. 08/529,746 filed Sep. 18, 1995 now abandoned.

FIELD OF THE INVENTION

The present invention is related to snap-in fasteners. The fasteners allow the panels to be assembled together and disassembled with little or no tooling.

BACKGROUND OF THE INVENTION

Various techniques have been used to connect picket fence panels. For example, U.S. Pat. Nos. 3,822,053, 4,540,160, 4,723,760, 5,120,025, 5,150,885, 5,161,783 and 5,372,354 disclose picket fence assemblies using several different means for connecting the vertical pickets to the horizontal rails. Such picket fence assemblies are increasingly being fabricated from plastics such as PVC due to the durability, appearance and low cost of such materials.

Flush-mounted picket fences are gaining widespread use, wherein an exterior surface of each horizontal rail is mounted against an exterior surface of each vertical picket. In this type of assembly, the rails and pickets are typically hollow and are connected by fasteners such as self-tapping screws or drive rivets. However, the use of such fasteners is relatively labor intensive and requires the use of tools for assembly. Moreover, such fasteners require holes to be drilled through the outwardly facing surfaces of the rails and/or pickets in order to allow access to the fasteners during assembly. These holes may be plugged by plastic caps and the like, but such caps represent additional costs in terms of component parts and assembly, and can detract from the appearance of the assembled fence.

In addition to picket fences, many other types of panels require flush-mount fasteners. For instance, in the automotive industry several different types of panel fasteners are used for attaching trim, emblems, upholstery, sheet metal parts and the like to support panels. Examples of such fasteners are disclosed in U.S. Pat. Nos. 3,842,709, 3,860,999, 3,939,752 and 4,652,192. Flush-mount fasteners may also be useful in the appliance and modular furniture industries.

The present invention has been developed in view of the foregoing and to overcome other deficiencies of the prior art.

SUMMARY OF THE INVENTION

An object of the present invention is to provide a novel fastener for flush-mounted panels.

Another object of the present invention is to provide an improved fastener for assembling panels such as fence rails and pickets using little or no tooling.

Another object of the present invention is to provide a method for assembling panels such as picket fence components using a snap-in fastener which requires little or no tooling.

Another object of the present invention is to provide a fastener for both assembling and disassembling panels, such as a jack stowage cover which is repeatedly attached to and removed from a fixed panel.

DETAILED DESCRIPTION OF THE PREFERRED EMBODIMENTS

Figure 1:
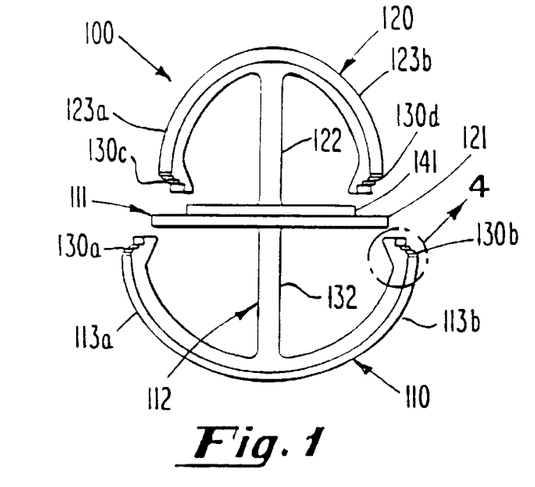
FIG. 1 is an elevational view of a fastener in accordance with an embodiment of the present invention.
Figure 2:
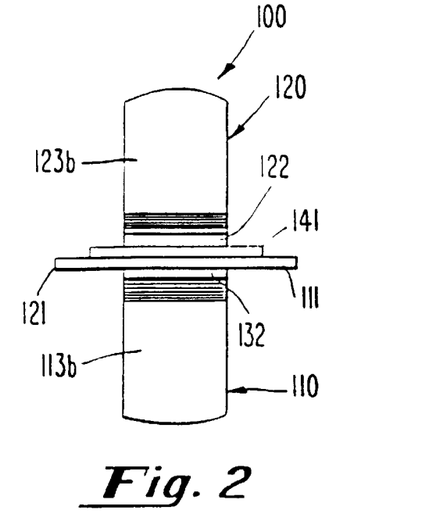
FIG. 2 is a side view of the fastener shown in FIG. 1.

Referring now to the drawings in detail, wherein like reference numerals indicate like elements throughout the several views, there is shown in FIG. 1 an elevational view of a fastener 100 in accordance with an embodiment of the present invention. The fastener 100 as illustrated includes, as portions thereof, a body 112, first and second connecting members 110 and 120, respectively, and a shoulder 111, which will be described in further detail in the following paragraphs.

The body 112, as seen in FIG. 1, is substantially elongated along its longitudinal axis and includes the connecting members 110 and 120 at its terminating ends. The shoulder 111 is connected with the body 112 and positioned between the connecting members 110 and 120. In this embodiment, the position of the shoulder 111 is substantially transverse the body 112 and separates the body 112 into the portions 122 and 132.

The connecting members 110 and 120 as best illustrated in FIG. 1 each define a pair of legs which are attached to the terminating ends of the body 112; specifically, the first connecting member 110 is defined by the legs 113a and 113b, and the second connecting member 120 is defined by the legs 123a and 123b. In this embodiment, each of the legs 113a,b and 123a,b are radiused which provides a substantially arch-shaped configuration of the first and second connecting members 110 and 120.

In addition, the connecting members 110 and 120 are flexible due to the resiliency of the legs 113a,b and 123a,b and accordingly are moveable relative to the position of the body 112. Further, as best seen in FIG. 1, the position of the terminating ends 130a–d of the legs 113a,b and 123a,b, which are opposite the connection with the body 112, are positioned proximate to the shoulder 111. In accordance with the present embodiment, the width of the first connecting member 110 between the terminating ends 130a,b of the legs 113a and 113b is greater than that of the second connecting member 120, which is defined by the width between the terminating ends 130c and d of the legs 123a and b.

Figure 4:
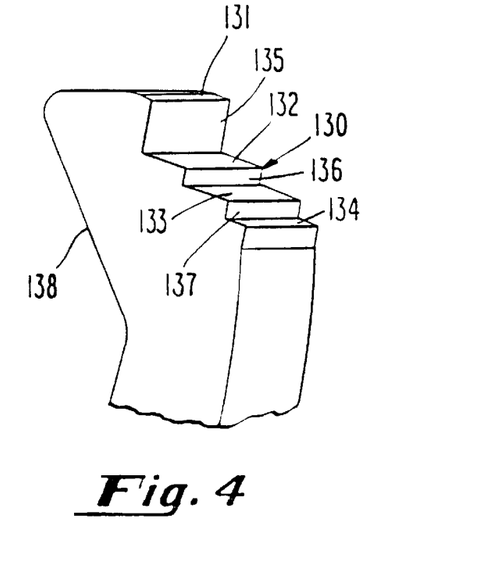
FIG. 4 is a detailed view showing a portion of the fastener of FIG. 1.

In FIG. 4 is illustrated a detailed view of the terminating end 130b of the leg 113b. As illustrated in FIG. 4, the leg 113b proximate its terminating end 130b is tapered inwardly along the surface 138 in the direction of the body 112. Opposite the surface 138 is provided a substantially stepped section defined by the surfaces 131–137. Although not shown in detail, the portions 130a, c and d are of the same configuration as that of the portion 130b.

Figure 3:
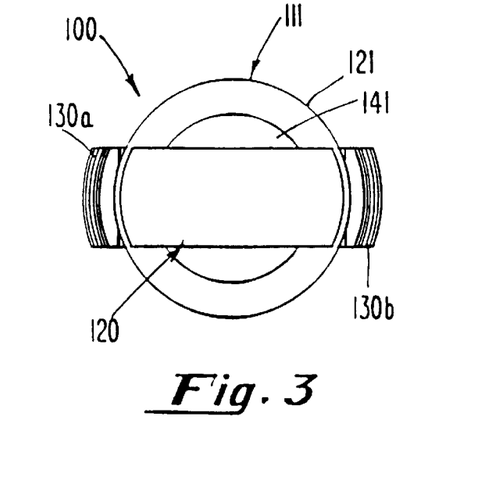
FIG. 3 is a top view of the fastener shown in FIG. 1.

The shoulder 111, as best seen in the top plan view of FIG. 3, is a substantially annular member defined by the pair of annular portions 121 and 141, with the portion 121 being positioned proximate the connecting member 110 and the portion 141 being positioned proximate the connecting member 120. In this embodiment, the radius of the portion 121 is greater than that of the portion 141.

In the present embodiment, the fastener 100 is preferably comprised of plastic, such as acetal, however, it should be understood that other suitable materials can also be used for this purpose.

Figure 5:
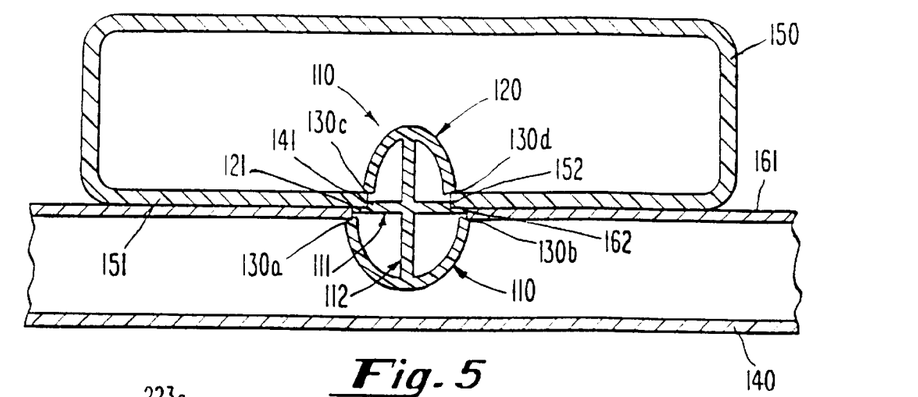
FIG. 5 is a side cross sectional view of the fastener of FIG. 1 installed in a vertical fence picket and horizontal rail.

The operation of the fastener 100 will now be described. The fastener 100 as illustrated in FIG. 5 is positioned securing together opposing panel members 140 and 150. In the present embodiment, the first and second panel members 140 and 150 comprise a vertical fence picket and horizontal rail, preferably manufactured of vinyl. However, it should be understood that the fastener 100 in accordance with the present invention can be used with other types of panel members as well. For example, the first and second panel members 140 and 150 can comprise doors, panels or similar that are manufactured from any suitable material. One example are modular furniture pieces. In the illustrated embodiment, the panel members 140 and 150 in FIG. 5 are secured by the fastener 100 in flush engagement with each other against the corresponding surfaces 151 and 161. Each of the panel members 140 and 150 are provided with substantially annular apertures therein for receiving the fastener 100 in the manner shown. In addition, the first and/or second panels 140 and 150 can include a mounting element, such as a grommet, received into the substantially annular apertures into which the fastener is adapted to be received in operation. As illustrated, the diameter of the aperture 162 through the surface 161 of the first panel member 140 is sized substantially corresponding to the diameter of the portion 121 of the shoulder 111. Similarly, the diameter of the aperture 152 through the surface 151 of the second panel member 150 is sized substantially corresponding to the diameter of the second portion 141 of the shoulder 111. In accordance with the present invention, upon assembly the first and second connecting members 110 and 120 are inserted into the apertures 152, 162 through the first and second panel members 140 and 150. As the first and second connecting members 110 and 120 are being inserted into the respective apertures, the legs 113a,b and 123a,b are flexed inward through the engagement with the panel surfaces 151 and 161. When the fastener 100 is installed in the position shown in FIG. 5, the legs 113a,b and 123a,b flex outward and snap into the apertures 152, 162 with the end portions 130a–d coming into contact with the edges of the surfaces 151 and 161. In the present embodiment, the second connecting member 120 is inserted first into the second panel member 150. As the second connecting member 120 is installed, the portion 141 of the shoulder 111 is received within the aperture 152 in the second panel member 150, and the portion 121 engages the surface 151. Thereafter, the first connecting member 110 is installed in the first panel member 140. Similarly, the portion 121 of the shoulder 111 is received within the aperture 162 through the first panel member 140. In this configuration, the first and second panel members 140 and 150 are provided in flush engagement to each other.

Figure 6:
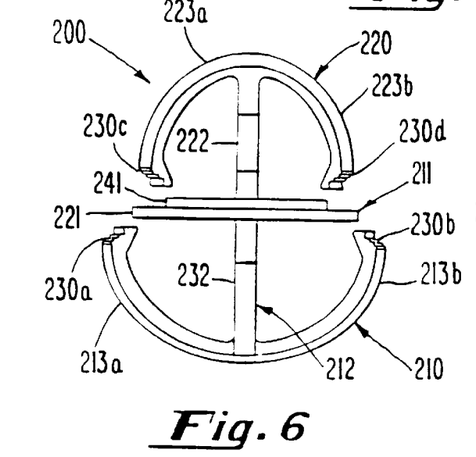
FIG. 6 is an elevational view of a fastener in accordance with another embodiment of the present invention.
Figure 7:
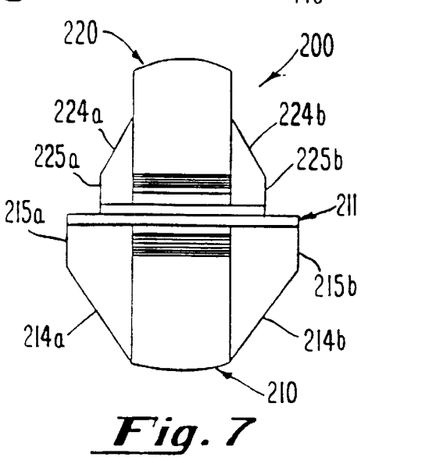
FIG. 7 is a side view of the fastener shown in FIG. 6.
Figure 8:
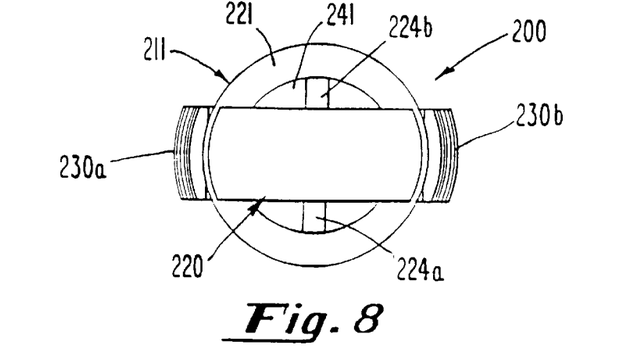
FIG. 8 is a top view of the fastener shown in FIG. 6.

In FIGS. 6–8 is illustrated a fastener 200 in accordance with another embodiment of the present invention. In the present embodiment, the portions corresponding to the portions described in relation to the fastener 100 are described using the same number designations except beginning with the number 200. In order to simplify the description herein, only the portions which are different from that in relation to the fastener 100 will now be described. The fastener 200 as illustrated includes an enlarged body 212 as compared with the body 112 earlier described. Specifically, as best shown in the side view of FIG. 7, the portion 232 of the body 212 is elongated in a direction transverse its longitudinal axis. The configuration of the portion 232 of the body 212 includes an area of substantially constant diameter extending from the portion 221 of the shoulder 211 by the surfaces 215a and b, and then taper inward in the direction of the first connecting member 210 by the surfaces 214*a* and *b*. Similarly, the configuration of the portion 222 of the body 212 includes an area of substantially constant diameter extending from the portion 241 of the shoulder 211 by opposing surfaces 225*a* and *b*, and tapers inward along the surfaces 224*a* and *b* in the direction of the second connecting member 220.

Although not shown, the fastener 200 is assembled in corresponding panel members in the same manner illustrated in relation to the fastener 100. An advantage provided by the fastener 200 is that the enlarged configuration of the body 212 provides for improved centering as the fastener 200 is installed within the apertures in the panel members. Furthermore, there is also provided increased shear strength due to the position of the body member 212 within the respective apertures.

Figure 9:
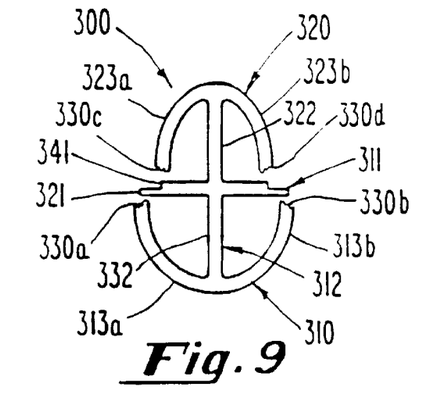
FIG. 9 is an elevational view of a fastener in accordance with another embodiment of the present invention.

In FIG. 9 is illustrated still a further embodiment of the fastener of the present invention. Similar to the fastener 200, the portions of the fastener in the present embodiment which correspond to the portions described in relation to the fastener 100 are described using the same number designations except beginning with the 300. Further, for the sake of brevity, only the portions which are different from that in relation to the fastener 100 will be described herein. As is illustrated, some minor differences are in the configuration of the ends 330*a–d* of the first and second connecting members 310 and 320. In particular, in this embodiment, each of the legs 113*a,b* and 123*a,b* are radiused along the entire length rather than bending slightly inward in the direction of the body 312 at its terminating ends, as is present in relation to the fastener 100 by surface 138. However, these differences in the configuration of the end portions 330*a–d* do not provide a differing function from that of the fastener 100. Another difference resides in the configuration of the shoulder 311. In the present embodiment, the shoulder 311 is substantially rectangular rather than being substantially angular in configuration, as is illustrated in the top plan view of FIG. 3 in relation to the shoulder 111. The main difference provided here due to the configuration of the rectangular shoulder 311 is that the portion 321 will only come into engagement with the panel member along its end portions. Further, another difference is that the fastener 300 can be mounted within a substantially rectangular aperture due to the configuration of the shoulder 311.

Figure 10:
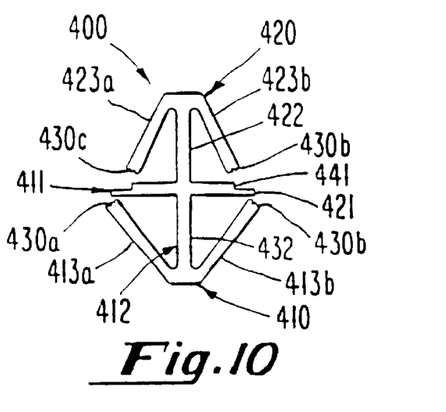
FIG. 10 is an elevational view of a fastener in accordance with a further embodiment of the present invention.

In FIG. 10 is illustrated still a further embodiment of the fastener according to the present invention. In this embodiment, similar to the earlier embodiments, the portions which correspond to the fastener 100 are described using the same number designations except beginning with the number 400. Also, only the portions which are different from that earlier recited will now be described. In the present embodiment, the configuration of the first and second connecting members 410 and 420 are substantially v-shaped rather than arch-shaped as with the fastener 100. Furthermore, the configuration of the shoulder 411 in this embodiment corresponds to the configuration of the shoulder 311 described above.

Figure 11:
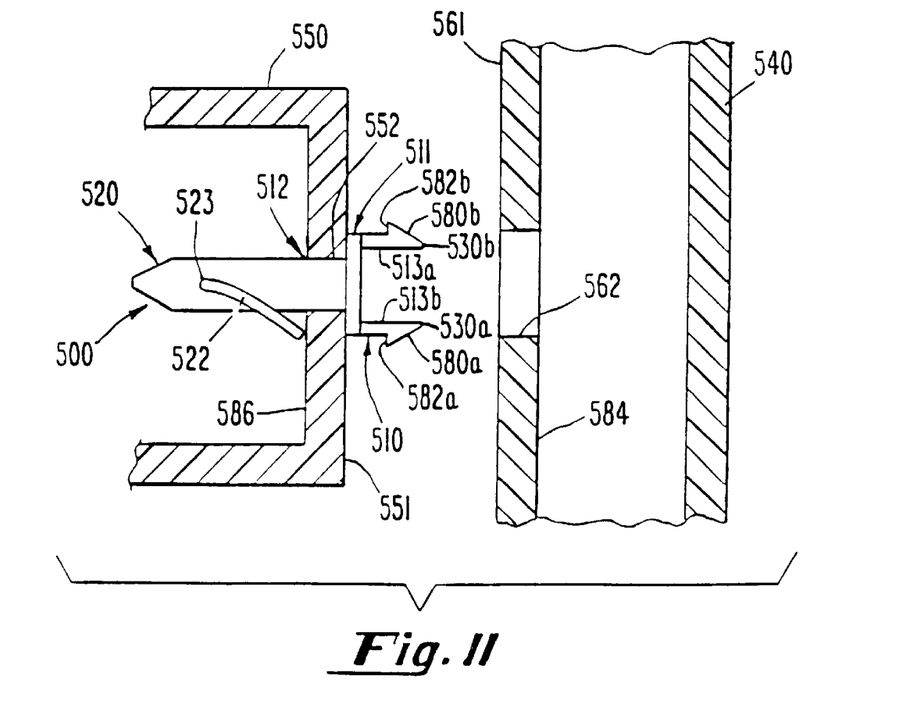
FIG. 11 is a side view of a fastener in accordance with another embodiment of the present invention as installed in a fence rail and adapted for insertion into a fence picket.
Figure 12:
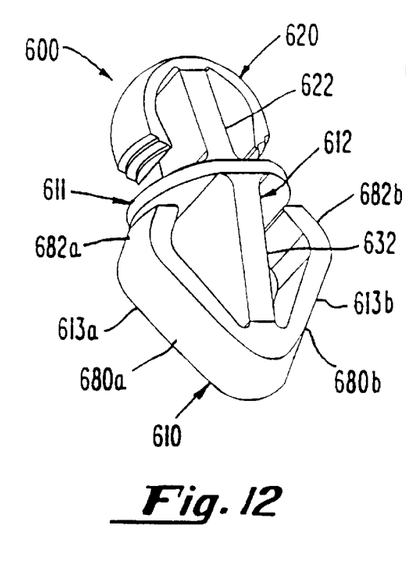
FIG. 12 is a perspective view of a fastener in accordance with another embodiment of the present invention.

FIG. 11 illustrates still another embodiment of the fastener of the present invention. In this embodiment, the fastener 500 is illustrated installed in a fence rail and is adapted for insertion into a fence picket. Consistent with the foregoing embodiments, the portions identified in this embodiment which correspond to the earlier embodiments will be described using the same number designations beginning with the number 500. The following will describe the differences in the present embodiment from that of the fastener 100. As illustrated in FIG. 11, the first connecting member 510 comprises a pair of legs 513*a* and 513*b* similar to the fastener 100. One difference in the fastener 500 is in the configuration of the legs 513*a,b*. In particular, the ends 530*a,b* include camming surfaces 580*a,b* and locking surfaces 582*a,b*. The camming surfaces 580*a,b* are adapted to engage the edges of the aperture 562 for flexing the legs 513*a,b* inward as the fastener 500 is being installed. When the fastener 500 has been installed within the aperture 562, the legs 513*a,b* again are flexed outward and the locking surfaces 582*a,b* engage the inside surface 584 of the picket 540 for retaining the fastener 500 in this latch position. Further, another difference in the fastener 500 is that the legs 513*a,b* are attached directly to the shoulder 511 rather than to the body as is illustrated in the fastener 100. The remaining portion of the fastener 500 is similar to a conventionally known fastener manufactured by the assignee of the present application under the name "Southco Spring Lock", Part Number T3-4229. Specifically, as is illustrated in FIG. 11, the body 512 extends from the shoulder 511 and terminates by the second connecting member 520. The second connecting member 520 includes a locking spring 522 extending on each side of the body 512 (only one side of which is visible) and is passed through an aperture 523. For mounting of the fastener 500 within the rail 550, a bow-tie shaped aperture 552 is provided within the surface 551 which receives the second connecting member 520. This is followed by a one half turn of the fastener 500 so that the locking spring 522 is brought into engagement with the inside surface 586 of the rail 550. Similar to that earlier described, when the fastener 500 is in its latched position, the picket 540 and rail 550 are in a flush position with the surfaces 561 and 551 in engagement with one another. Further, it should be understood that the fastener 500 can be used in applications other than with picket fences where mounting of panel members are desired.

Figure 13:
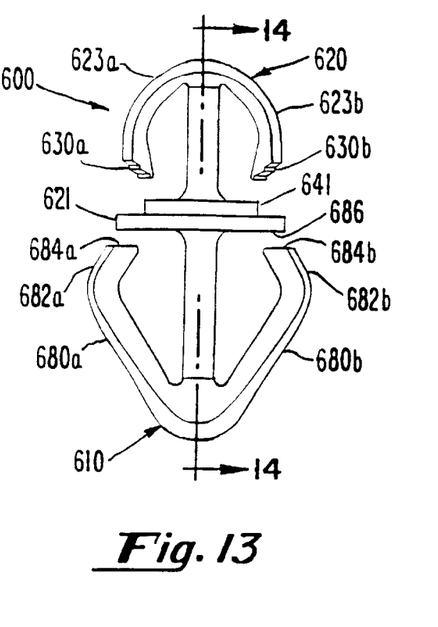
FIG. 13 is front elevational view of the fastener shown in FIG. 12.

In FIGS. 12–15 is illustrated a fastener 600 in accordance with another embodiment of the present invention. In the present embodiment, the portions corresponding to the portions described in relation to the fastener 100 are presented using the same number designations except beginning with the number 600, and in order to simplify the description herein, only those portions which are different from that in relation to the fastener 100 will be described. The primary difference of the fastener 600 from the fastener 100 is that the fastener 600, when assembled in corresponding panel members to secure the panel members together, such as is illustrated in relation to the fastener 100, is also adapted to be removed from the corresponding panel members in order to allow the panel members to be disassembled. For this purpose, the fastener 600 in the present embodiment includes a first connecting member 610 defined by a pair of legs 613*a* and 613*b*. In accordance with the present embodiment, each of the legs 613*a* and 613*b* are defined by at least first and second portions 680*a*, 680*b* and 682*a*, 682*b*, respectively. In the present embodiment, preferably each of the first portions 680*a* and 680*b* are attached with and extend in a direction generally away from the body 612, defining a substantially V-shaped configuration. In addition, in this embodiment preferably the second portions 682*a* and 682*b* are positioned at the terminating ends of the legs 613*a* and 613*b* and extend from the respective first portions 680*a* and 680*b* in a direction generally toward the body 612. In this manner, the configuration of the first and second portions 680*a* with 682*a* and 680*b* with 682*b* of each of the legs 613*a* and 613*b* at the connection thereof are generally V-shaped, and more particularly, substantially radiused in this embodiment. As best seen in FIG. 13, the second portions 682*a* and 682b have terminating ends 684a and 684b which are substantially planar and parallel with a bottom surface 686 of the portion 621 of the shoulder 611.

Figure 14:
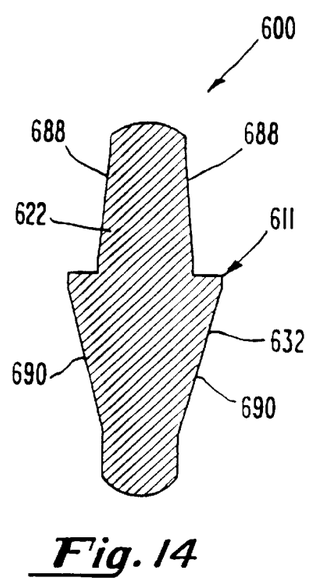
FIG. 14 is a side sectional view of the fastener shown in FIG. 12 taken along the line 14—14 of FIG. 13.

As best seen in the side sectional view of FIG. 14, the configuration of the portions 622 and 632 of the body 612 are similar to that in relation to the fastener 200. In particular, the portion 622 includes front and back walls 688 which taper outwardly from the connection with the second connecting member 620 to the shoulder 611. Similarly, the portion 632 includes front and back surfaces 690 which taper outwardly from the connection with the first connecting member 610 to the shoulder 611.

Figure 15:
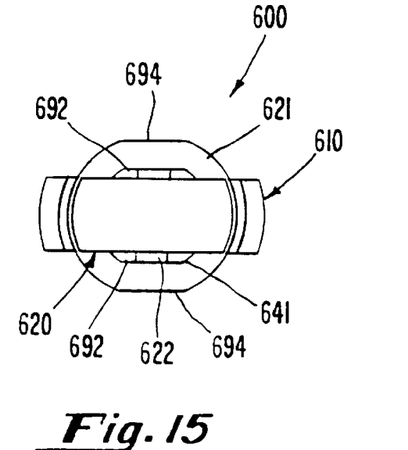
FIG. 15 is a top plan view of the fastener shown in FIG. 12.

As shown in the top plan view of FIG. 15, another difference in the fastener 600 from that of the fastener 100 is in the configuration of the shoulder 611. In the present embodiment, each of the portions 621 and 641 of the shoulder 611 are generally annular, with the portion 621 including substantially flat back and front surfaces 692 and the portion 641 including substantially flat front and back surfaces 694.

In operation of the fastener 600 in relation to the first and second panel members 140 and 150 in FIG. 5, the legs 613a and 613b snap into the aperture 162, with the second portions 682a and 682b coming into contact with the edges of the surface 161 proximate the aperture 162. In particular, as the legs 613a and 613b are installed in the aperture 162, the legs 613a and 613b initially flex inward due to the outward taper of the first portions 680a and 680b. Thereafter, as the first portions 680a and 680b are moved past the aperture 162, the legs 613a and 613b flex outward due to the inward taper of the second portions 682a and 682b and snap into the aperture 162, with the outer surfaces of the second portions 682a and 682b then coming into engagement with the edges of the aperture 162. Mounting of the second connecting member 620 in the aperture 152 is the same as that in relation to the second connecting member 120 of the fastener 100.

In accordance with the present embodiment, the fastener 600 can also be removed in order to disconnect or disassemble the panel members 140 and 150. In the present embodiment, the first connecting member 610 can be removed by being snapped out from the secured position within the aperture 162 of the panel member 140 due to the substantially radiused connection of the first and second portions 680a with 682a and 680b with 682b. In operation, preferably the first connecting member 610 is removed from the aperture 162 by either pulling or pushing the panel member 150 with a reasonable amount of force that an operator can exert by hand, which initially flexes the legs 613a and 613b inward due to the outward taper of the second portions 682a and 682b. Thereafter, the substantially radiused connecting portions of the first and second portions of legs 613a and 613b pass through the aperture of the panel member and the legs 613a and 613b then flex outward as the first portions 680a and 680b are moved out of the aperture 162. In addition, the first connecting member 610 can be removed by pulling or pushing the panel member 140 or pulling or pushing the fastener 600 itself.

An advantage provided by the fastener 600 is that the fastener can be both installed to secure two panels together as well as removed so that the panels can be disassembled and without requiring any tools for either assembly or disassembly. In the present embodiment, the first connecting member 610 is removable from the panel aperture while the second connecting member 620 is permanently secured in the panel aperture. For example, the second connecting member 620 can be permanently snapped into a first panel member, such as a jack stowage cover, and the first connecting member 610 can be both snapped in and out of a second panel member, such as a fixed panel, by pulling or pushing on the jack stowage cover. In addition, the body 612 provides for improved centering as the fastener 600 is installed within the apertures in the panel members, similar to that in relation to the fastener 200.

Figure 16:
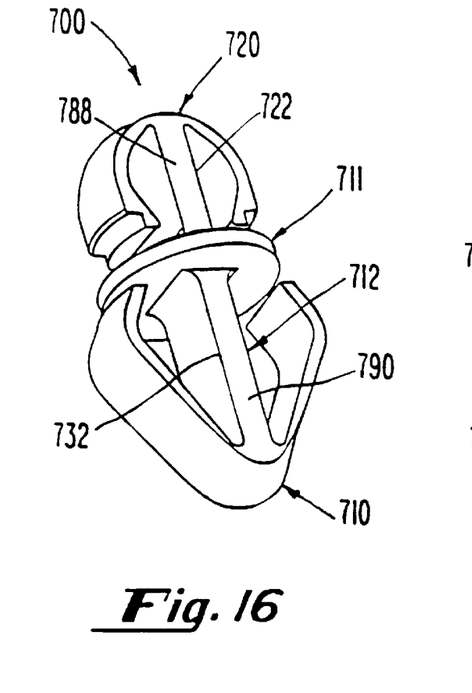
FIG. 16 is a perspective view of a fastener in accordance with another embodiment of the present invention.
Figure 17:
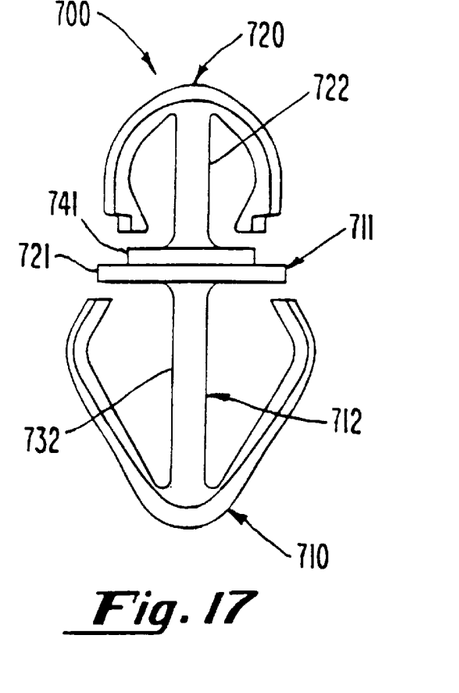
FIG. 17 is a front elevational view of the fastener shown in FIG. 16.
Figure 18:
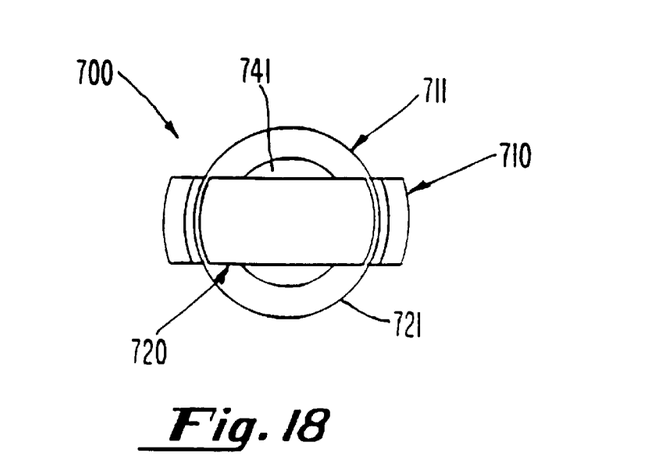
FIG. 18 is a top plan view of the fastener shown in FIG. 16.

In FIGS. 16–18 is illustrated a fastener 700 in accordance with another embodiment of the present invention. In the present embodiment, for the sake of brevity, only the portions which are different from that described in relation to the fastener 600 will be described herein, and corresponding portions will be described using the same number designations except beginning with the number 700. As is illustrated, the configuration of the shoulder 711 and body 712 of the fastener 700 are slightly different than that in relation to the fastener 600. As best seen in the top plan view of FIG. 18, the shoulder 711 defined by the portions 721 and 741 is substantially annular over its entire surface. Further, the body 712 which is defined by the portions 722 and 732, include substantially flat front and back surfaces 788 and 790, respectively (only the front surfaces are shown), which is similar to that illustrated in relation to the fastener 100. The remaining structure and operation of the fastener 700 is the same as that of fastener 600 and will not be further described for this reason.

In FIGS. 19–23 is illustrated a fastener 800 in accordance with another embodiment of the present invention. For the sake of brevity, in the present embodiment only the portions which differ from that illustrated in relation to the fastener 700 will be described in detail herein. In the present embodiment, the fastener 800 comprises a first connecting member 810 mounted in a panel 840 shown in section and a second connecting member 820 mounted in a panel member 850 shown in section; for example, similar to the panel members 140 and 150. In the present embodiment, the second connecting member 820 is similar to the second connecting member 620 and 720 comprising a pair of generally elongated legs attached to a body which, in operation, are adapted to be snapped into the panel 850. Although not shown, the second connecting member 820 can also be in the form of the first connecting members 610 and 710 that are adapted to be snapped both into and out of a respective panel.

Figure 19:
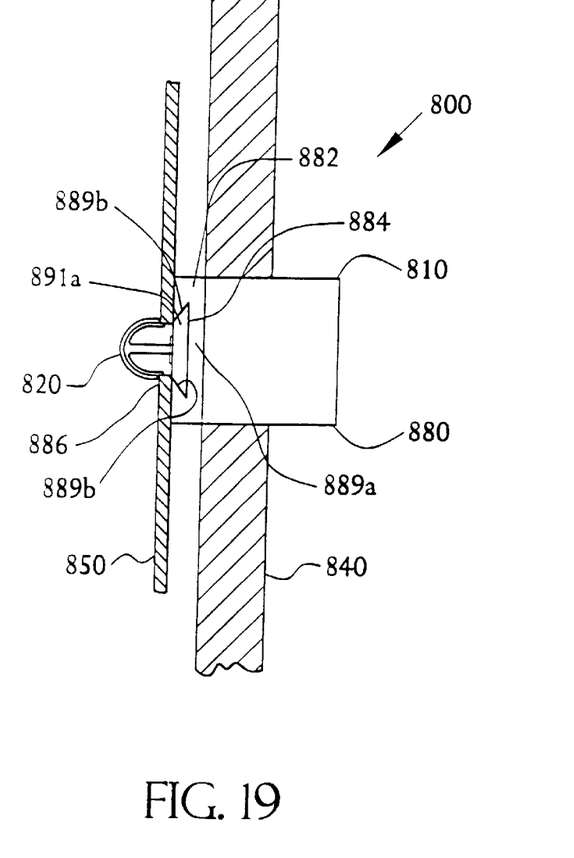
FIG. 19 is an elevational view of a fastener in accordance with another embodiment of the present invention attached with respective panels shown in section.
Figure 23:
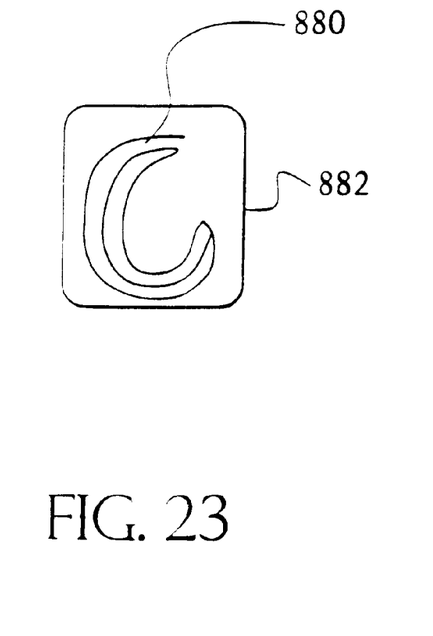
FIG. 23 is a bottom plan view of the first connecting member of FIG. 22.

The first connecting member 810 in the present embodiment comprises a base having a mounting element 880 received into the aperture through the panel member 840. As best illustrated in FIGS. 19 and 23, the mounting element 880 in the present embodiment is generally elongated along a longitudinal axis and is generally C-shaped in cross section, although as should be understood other configurations can be utilized for the same purpose.

Figure 20:
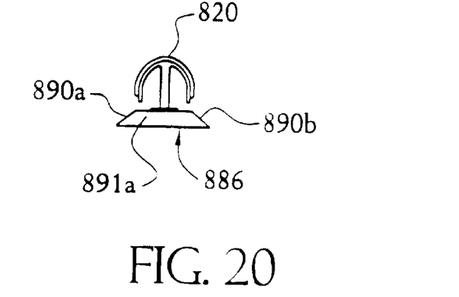
FIG. 20 is an isolated front elevational view of a second connecting member of FIG. 19.
Figure 21:
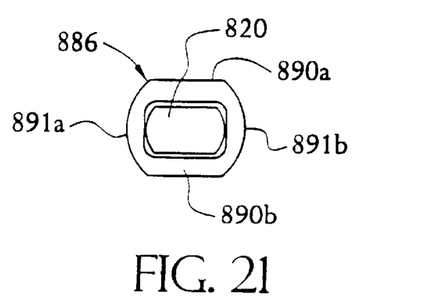
FIG. 21 is an isolated top plan view of the second connecting member of FIG. 20.
Figure 22:
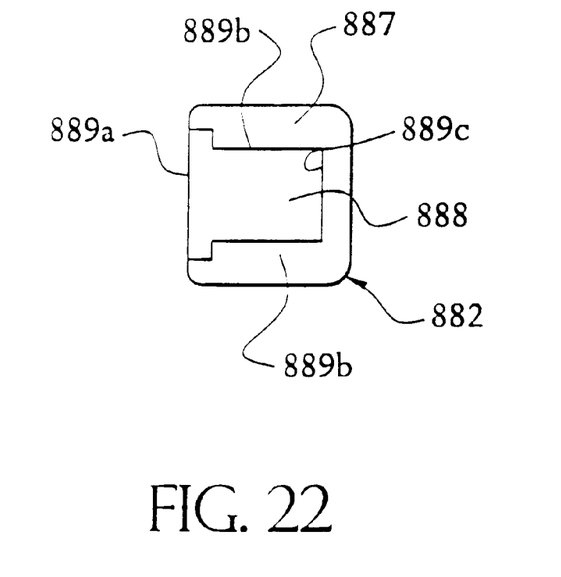
FIG. 22 is an isolated top plan view of a first connecting member of FIG. 19.

Further, the fastener 800 also includes means between the base 810 and the connecting member 820 for both attaching the base 810 and the connecting member 820 together and detaching the base 810 and the connecting member 820 from the attached position. For this purpose, in this embodiment, the fastener 800 includes a platform 882 on the base having a receptacle 884 therein and a shoulder 886 on the connecting member 820, which is adapted for movement both into and out of the receptacle 884, as illustrated in FIG. 19. In this embodiment, as best seen in FIG. 22, the platform 882 further comprises a perimeter having an upper surface 887, a cavity within the upper surface 887 terminating by a bottom surface 888 and at least one and preferably four side surfaces 889a–889d, with the four sides defining a first side 889a and a third side 889c substantially opposing each other and a second side 889b and a fourth side 889d substantially opposing each other. The first side 889a as best illustrated in FIG. 19 includes an opening therein extending from the cavity within the upper surface 887 to the perimeter of the platform 882. In addition, in this embodiment, as best shown in FIG. 19, the second side 889b and fourth side 889d each have a receptacle therein comprising a generally elongated channel adjacent to the shoulder 886. As illustrated in FIGS. 20 and 21, the shoulder 886 of the second connecting member 820 is generally rectangular in the present embodiment defining substantially opposing side portions 890a and 890b and opposing end portions 891a and 891b. In this embodiment, the opposing side portions 890a and 890b are each ramped inward in a direction from a bottom surface to a top surface of the shoulder 886. In the present embodiment, the shoulder 886 is slidable both into and out of the cavity within the platform 882. For example, in the present embodiment, the shoulder 886 is adapted to be moved into and out of the opening in the first side 889a and cavity of the platform 882, which is accomplished as the opposing side portions 889a and 889b of the shoulder 886 are moved into and out of the generally elongated channels within the second and fourth sides 889b and 889d of the platform 882. In the present embodiment, the shoulder 886 and platform 882 operate to restrict movement of the portions relative to each other in all directions except for movements of the shoulder 886 and/or the platform 882 to accommodate movement of the shoulder 886 into and out of the opening through the first side 889a of the platform 882. Movements to engage or disengage the shoulder 886 and the platform 882 can be accomplished through movement of one or more of the panel member 840, first connecting member 810, panel member 850 and/or second connecting member 820. Where desired, the construction of the shoulder 886 and platform 882 can be such that connection of the two elements are possible but assembly is restricted, such as may be accomplished by a tight fit between shoulder 886 and platform 882 or an adhesive utilized in the connection of the elements in the present embodiment. The fastener 800 is preferably comprised of plastic, although other suitable materials can also be used for this purpose. In addition, while in the present embodiment the configuration of the platform 882 is generally square in configuration as shown in the top plan view of FIG. 22, and the cross section of the shoulder 886 is generally rectangular in configuration shown in the top plan view of FIG. 21, it should be understood that any other desired configuration can be utilized for the same purpose in accordance with the present invention.

Figure 24:
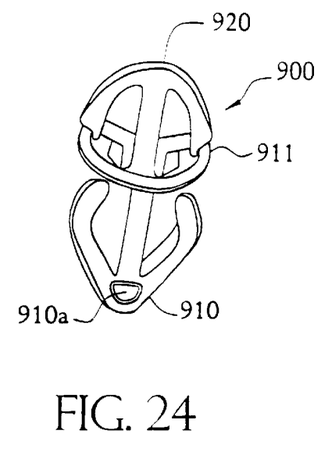
FIG. 24 is a perspective view of a fastener in accordance with another embodiment of the present invention.
Figure 25:
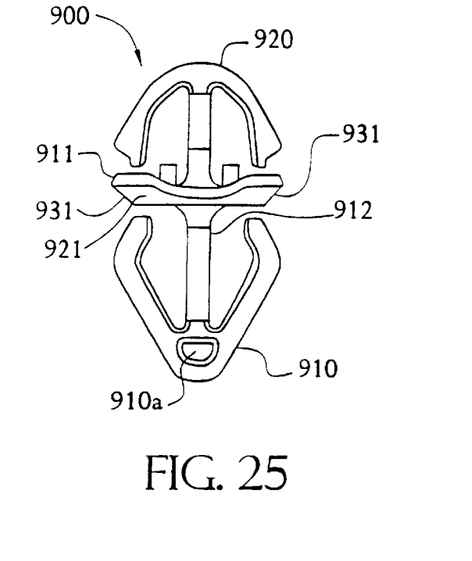
FIG. 25 is a front elevational view of the fastener shown in FIG. 24.
Figure 26:
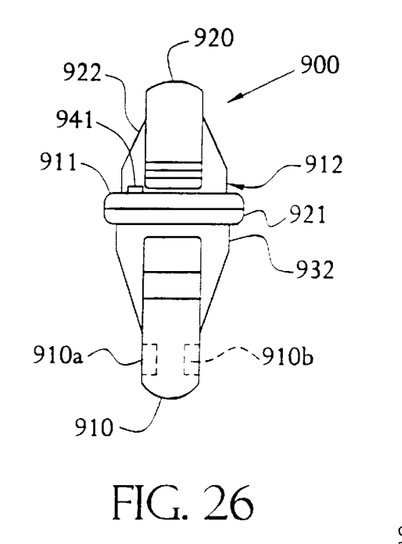
FIG. 26 is a right side elevational view of the fastener shown in FIG. 24.
Figure 32:
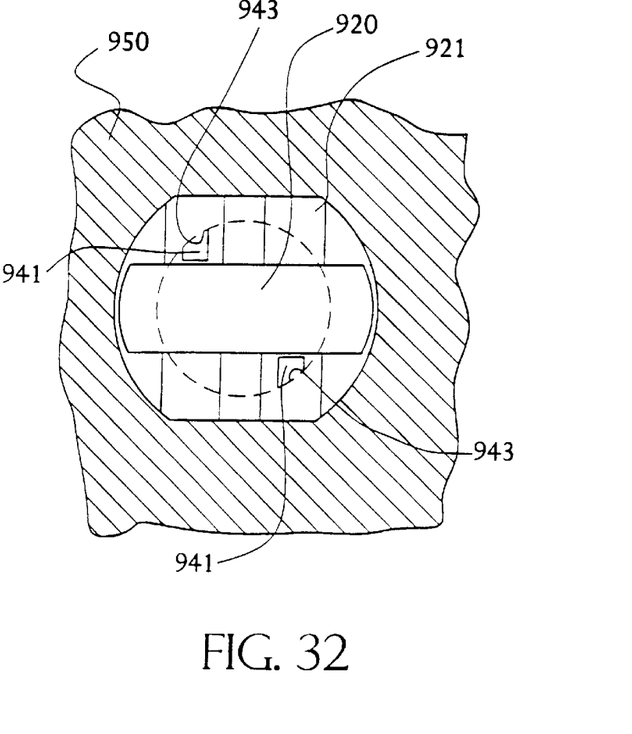
FIG. 32 is a top plan view of the fastener shown in FIG. 27 and illustrating the first panel member in dotted lines.

In FIGS. 24–26 is illustrated a fastener 900 in accordance with another embodiment of the present invention. For the sake of brevity, the features of the present embodiment will be described herein with reference to the earlier embodiments of the present invention. In this embodiment, the fastener 900 includes first and second connecting members 910 and 920 which are similar in configuration as the first and second connecting members 710 and 720 of the fastener 700. In this embodiment, it is shown that the width of the first and second connecting members 910 and 920 substantially transverse the body 912 are substantially equal, although this is not required and, as should be understood, any desired width for the respective connecting members 910 and 920 can be utilized where desired. As indicated earlier, the width of the first and second connecting members 910 and 920 are defined by the distance between the outermost portions of the two opposing generally flexible legs comprising the respective connecting members 910 and 920. In this embodiment, opposing cavities 910a and 910b, each generally radiused in configuration, is provided within the connecting member 910 at the location adjacent the body 912, as is best shown in dotted lines in the side elevational view of FIG. 26. In addition, as shown in FIG. 26, in the present embodiment, the body 912 includes portions 922 and 932 similar in configuration to the portions 622 and 632 of the fastener 600. In addition, in this embodiment, a shoulder 911 is defined by a portion 921 positioned proximate the first connecting member 910 and at least one and preferably a plurality of portions 941, which in the present embodiment comprises two portions 941 positioned proximate the second connecting member 920. The first portion 921 in this embodiment includes an upper surface and a lower surface at spaced separation and an outer surface 931 connecting the upper and lower surfaces, and with the outer surface 931 being substantially ramped in an inward direction toward the body 912 beginning at the upper surface and extending to the lower surface. The second and third portions 941 in this embodiment are substantially aligned and attached to the upper surface of the first portion 921 and at spaced separation from each other. In this embodiment, preferably each of the portions 941 defines an elongated projection and is generally triangular in cross-section, as best shown in the top plan view of FIG. 32, although, as should be understood, other suitable configurations can also be utilized for the same purpose. In addition, preferably a distance is defined between outer surfaces 943 of the second and third portions 941 and sized so as to be smaller than the width of the first portion 921 in the direction substantially transverse the body 912, as is best illustrated in FIGS. 25 and 32.

The operation of the fastener 900 will now be described with reference to FIGS. 27 and 32. In this embodiment, the fastener 900 is illustrated securing together two opposing panel members 940 and 950. Similar to that earlier described, the first and second connecting members 910 and 920 are mounted within apertures through the respective panel members 940 and 950. One difference in the present embodiment is that a mounting element is included which is mounted within the aperture in the first panel member 940 into which the first connecting member 910 is mounted. The mounting element in accordance with the present embodiment comprises a grommet 960 which will be described in detail below.

Figure 27:
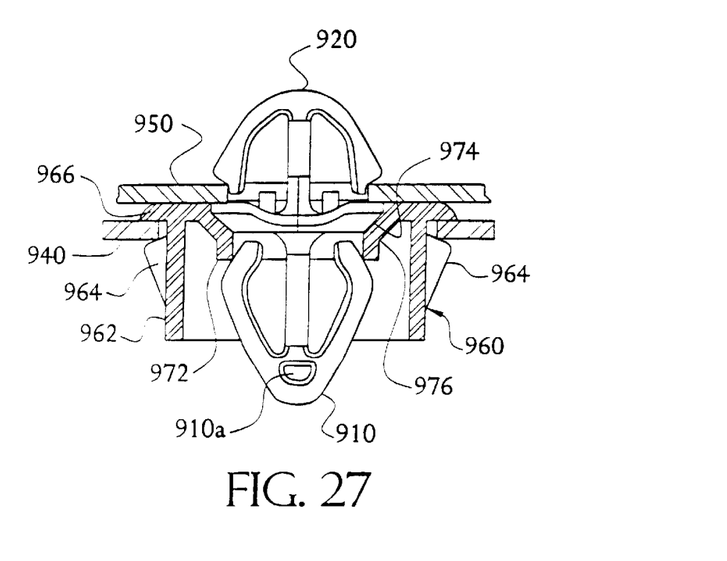
FIG. 27 is a front elevational view of the fastener shown in FIG. 24 illustrated installed in a portion of a first member shown in section and fastened in an embodiment of a grommet shown in section, with the grommet shown installed in a portion of a second member shown in section.
Figures 28, 29:
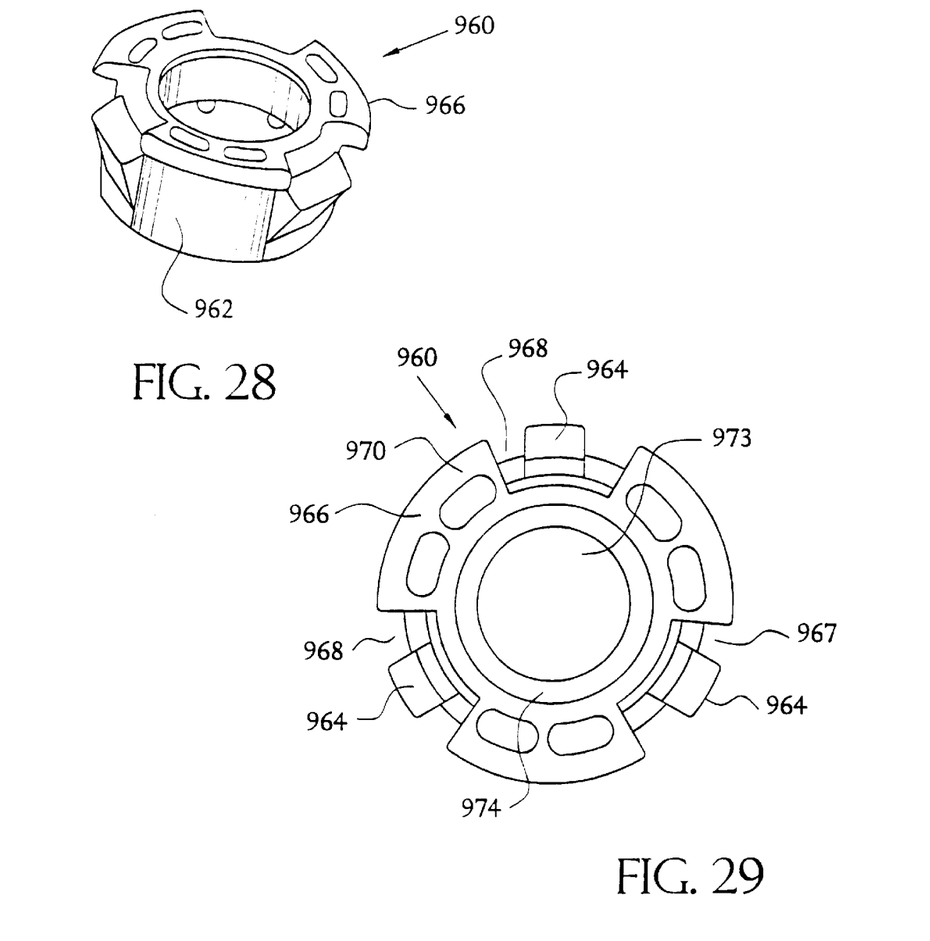
FIG. 28 is an isolated perspective view of the grommet shown in FIG. 27.
FIG. 29 is an isolated top plan view of the grommet shown in FIG. 28.
Figure 30:
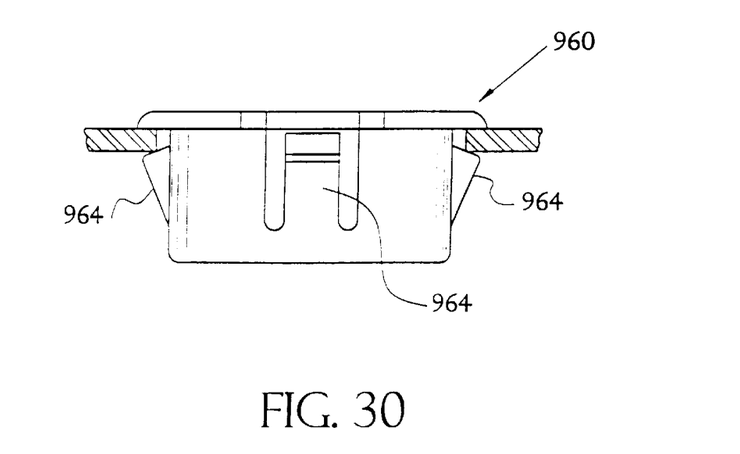
FIG. 30 is an isolated right side elevational view of the grommet shown in FIG. 27 illustrated mounted in the portion of the second member shown in section.

The grommet 960 in accordance with the present embodiment is illustrated in FIGS. 27–30. The grommet 960 as illustrated is generally cylindrical in configuration defined by a body 962 which is substantially tubular and hollow in this embodiment. The grommet 960 also includes at least one and preferably a plurality of generally flexible tabs 964 extending from the outer surface of the body 962. In this embodiment, three tabs 964 are provided, with each being generally rectangular in configuration and attached at one end to the body 962 and including a ramped camming surface extending from the first end thereof terminating by a substantially ramped locking surface. As best illustrated in FIGS. 27 and 30, the camming and locking surfaces of each of the tabs 964 together are generally V-shaped in configuration. The grommet 960 in the present embodiment also includes a flange 966 attached to an upper end of the body 962. As best shown in FIGS. 28 and 29, the flange 966 is generally annular in configuration and includes at least one and in this embodiment preferably three cutouts 968 generally rectangular in configuration and positioned adjacent to the three tabs 964. As best illustrated in FIGS. 27, 28 and 29, the flange 966 is defined by an upper surface 970, a lower surface 972 and an opening 973 substantially annular in configuration extending through the upper and lower surfaces 970 and 972 of the flange 966. In this embodiment, the opening 973 defines an inner surface comprised of a substantially ramped upper portion 974 and a substantially annular shaped bottom portion 976. In addition, in the present embodiment, the grommet 960 may also include within the upper surface a plurality of depressions, each generally oval in configuration. Similar to the fastener 900, the grommet 960 is preferably manufactured from conventional thermoplastic or thermosetting materials, such as by injection molding, although any other suitable materials and manufacturing processes can also be used for this same purpose where desired.

Installation of the grommet 960 will now be described with reference to FIGS. 27 and 30. On installation, the body 962 of the grommet 960 is first inserted into the aperture in the first panel member 940, so that the ramped camming surface of the tabs 964 come into engagement with the edge of the panel 940. Continued insertion of the grommet 960 results with the tabs 964 being flexed inward until the grommet 960 is mounted in a position shown in FIGS. 27 and 30, at which point the tabs 964 are able to flex back toward their original position. The grommet 960 is retained in the mounted position by the panel being positioned between the underside of the flange 966 and the locking surface of the tabs 964. In this embodiment, the tabs 964 provide installation of the grommet 960 without requiring any mounting hardware, such as screws or rivets. However, in other embodiments not disclosed, the tabs 964 can be substituted for any other desired arrangement for mounting of the grommet 960.

Figure 31:
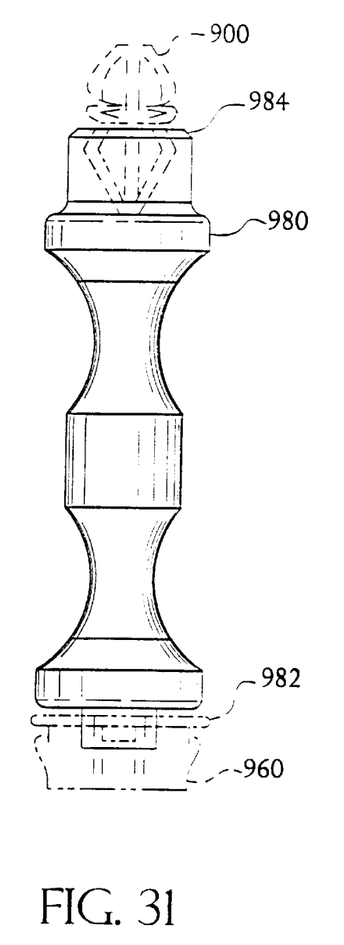
FIG. 31 is a front elevational view illustrating an embodiment of an installation tool in accordance with the present invention and illustrating in section a position of the fastener shown in FIG. 24 and grommet shown in FIG. 29 prior to assembly.

In FIG. 31 is illustrated an embodiment of an installation tool for mounting of one or both of the fastener 900 and grommet 960 as are shown in dotted lines. In this embodiment, the installation tool 980 is an elongated member having a substantially annular platform 982 at one end and a substantially annular cavity within its opposite end 984. Preferably, the diameter of the platform 982 is sized to correspond to the size of the cavity through the grommet 960 and the cavity through the second end 984 is sized so as to receive the two generally flexible legs comprising the first connecting member 910. Assembly of the fastener 900 and grommet 960 within the respective panels 940 and 950 would occur in a similar manner to that described above. As should be understood, while an installation tool is not required for mounting of either the fastener 900 or the grommet 960, when one is used, configurations other than that illustrated in FIG. 31 can be provided where desired. The installation tool 980 can be comprised of any suitable material, such as from molded plastic.

The operation of connecting the fastener 900 and grommet 960 so as to secure together respective panel members 940 and 950 will now be described. As discussed earlier, the panel members 940 and 950 can be any type of structure and comprised of any of a variety of different materials. In this embodiment, the grommet 960 is particularly suited for use in thin panels and/or panels made of sheet metal. In operation, as the panels 940 and 950 are moved together, the first connecting member 910 is received into the opening 973 through the grommet 960. Accordingly, in this embodiment the opening 973 through the grommet 960 corresponds to the aperture through the panel in the earlier embodiments. Engagement between the outer surface of the two generally flexible legs of the first connecting member 910 with the portions 974 and 976 defined by the opening 973 result with the legs first being flexed inward and then back toward their original position when secured in the position illustrated in FIG. 27. Similar to the fastener 600, the first connecting member 910 in this embodiment preferably can both be snapped into and snapped out of the grommet 960, although this is not required. In addition, in this embodiment, as shown in FIG. 27, the shoulder 911 is received into the opening 973 through the grommet 960, and preferably the upper surface of the first portion 921 of the shoulder 911 is positioned substantially flush with the upper surface 970 of the grommet 960, so that the outer surface of the second panel member 950 comes into engagement with the upper surface 970 of the grommet 960. In addition, in the present embodiment, when in the mounted position shown in FIG. 27, the outer surface 931 of the shoulder 911 is preferably in engagement with the ramped portion 974 defined by the opening 973. As best shown in FIG. 32, in this embodiment, when the fastener 900 is secured to the second panel member 950, the outer surfaces 943 of the second and third portions 941 are each positioned adjacent and preferably in engagement with the second panel member 950 within the aperture therethrough. In the present embodiment, the second and third portions 941 provide improved centering of the fastener 900.

Although not shown, it should be understood that other variations and embodiments of the present invention are also possible. One modification would allow the fastener to be installed in panels with the same size apertures formed therein. For purpose of this illustration, reference will be made to the fastener 100, however, it should be understood that this particular modification can also have application with the other embodiments as well. In the present embodiment, the shoulder 111 is modified to provide a third portion similar to and opposite the portion 141 and connected with the portion 121. Further, the configuration of the first connecting member 110 is changed in order to correspond to the size and configuration of the second connecting member 120. Due to this difference in structure, another difference in the present embodiment from that earlier described is that a small gap would be present between the panels when installed rather than in flush engagement.

Further, another modification is that the number of legs comprising the first or second connecting members in either of the foregoing embodiments can be varied to comprise more or less than two legs as is described above. For example, in any one of the foregoing embodiments the first connecting member can include three legs and the second connecting member can include four legs. Similarly, other combinations are also possible. In addition, the width of the spring legs can also be varied to be either larger or smaller than that illustrated above. Further, the size of the entire fastener can be manufactured in smaller and larger sizes in order to accommodate different space and strength requirements.

Based on the foregoing description of the various embodiments of the present invention, it should be understood that there are several advantages provided. One particular advantage is that the fastener will snap into both of the panel members into which it is installed which provides for a quick joining of the panel members. Further, there are no additional holes required for installation which would need to be covered by hole plugs or similar. Further, the fastener can be adapted for applications where flush joining of the panel members is desired and can accommodate a range of panel thicknesses.

In addition, the fastener can also be modified to snap out of one or both of the panel members into which it is installed, which provides for a quick disassembly of the panel members.

It is understood that the above description of the present invention is susceptible to considerable modifications, changes and adaptations by those skilled in the art, and that such modifications, changes and adaptations are intended to be considered within the scope of the present invention, which is set forth by the appended claims. For instance, it should be understood that the features disclosed in relation to anyone of the embodiments of the present invention described above can also have application in the remaining embodiments as well. For example, the connecting member 110 as shown in FIG. 1 can be substituted for the connecting member 510 shown in FIG. 11. In addition, the removable connecting member 610 can be substituted for any one of the connecting members shown in FIGS. 1–18, for example, the connecting member 620 can be substituted for the connecting member 610 so that each of the connecting members correspond to the connecting member 610. Furthermore, it should be understood that each of the particular features disclosed in relation to any one embodiment of the present invention all do not need to be present in that particular embodiment in order to be considered within the scope and spirit of the present invention.

We claim:

1. A fastener for securing first and second panel members, each of said panel members including apertures for receiving said fastener for securing the panel members in a fastened position, said fastener comprising:

a generally elongated body;

first and second connecting means attached with said body for securing the fastener in the aperture of the first and second panel members, at least the first connecting means comprising mounting means for snapping in said first connecting means within the aperture of the first panel member, with the second connecting means comprising means for being received within the aperture of the second panel member;

said generally elongated body further including a shoulder between said first and second connecting means;

wherein at least the first connecting means further comprises removing means for snapping out said first connecting means when secured within the aperture of the first panel member through only application of at least one of a suitable pulling or pushing force upon at least one of said first panel member, said second panel member or said fastener; and a grommet for being received within the aperture of the first panel member, said grommet including means for mounting said grommet in said aperture of said first panel member independent said first connecting means and said grommet further comprising an opening for receiving said first connecting means in a fastened position;

wherein said mounting means of said grommet comprises a body and a plurality of flexible snap legs extending from said body.

2. A fastener according to claim 1, wherein said mounting means and said removing means comprises at least two generally flexible legs.

3. A fastener according to claim 2, wherein each of said at least two generally flexible legs define at least first and second portions, said first portion being proximate said attachment with said body and extending in a direction generally away from said body, said second portion being proximate a terminating end of said generally flexible leg and extending in a direction generally toward said body, wherein said first portion of each of said generally flexible legs is attached with said body at a first end and with said second portion at a second end, wherein said first portions of said at least two generally flexible legs are generally V-shaped, and said first and second portion of each of said generally flexible legs at least proximate the connection thereof are generally radiused.

4. A fastener according to claim 2, wherein said grommet further includes a flange adapted for engaging an outer surface of said first panel member, said grommet body defining an outer surface having said plurality of flexible snap legs, upper and lower surfaces at spaced separation and an opening extending through said upper and lower surfaces defining a substantially ramped inner surface, and said shoulder includes an upper surface, a lower surface and a substantially ramped outer surface, wherein said substantially ramped outer surface of said shoulder engages said substantially ramped inner surface of said grommet, said upper surface of said shoulder is substantially flush with said flange of said grommet, and said at least two generally flexible legs of said first connecting means substantially engages said lower surface of said grommet.

5. A fastener comprising:

a body generally elongated along a longitudinal axis thereof;

first and second connecting means attached with said body, wherein at least the first connecting means comprises means for mounting and dismounting said fastener comprising at least two generally flexible legs, each of said at least two generally flexible legs defining at least first and second portions, said first portion being proximate said attachment with said body and extending in a direction generally away from said body, and said second portion being proximate a terminating end of said generally flexible leg and extending in a direction generally toward said body, wherein said first portion of each of said generally flexible legs is attached with said body at a first end and with said second portion at a second end, wherein said first and second portions of each of said generally flexible legs at least proximate the connection thereof are substantially radiused; and said body further including a shoulder substantially transverse said longitudinal axis of said body, wherein said shoulder includes at least adjacent first and second portions, with said first portion being proximate said first connecting means and said second portion being proximate said second connecting means, wherein said second portion is of a defined width substantially transverse said body and said first portion is of a width substantially transverse said body greater than the defined width of said second portion; and wherein said shoulder further includes at least a third portion positioned closer to said second connecting means than to said first connecting means and attached to said first portion and at spaced separation from said second portion, wherein said second and third portions are substantially aligned and spaced so that a distance between outer surfaces thereof substantially transverse said body is smaller than said width of said first portion substantially transverse said body.

6. A fastener according to claim 5, wherein said second connecting means comprises at least two generally flexible legs.

7. A fastener according to claim 6, wherein said at least two generally flexible legs of said first and second connecting means are defined by inner and outer surfaces, wherein the first and second connecting means have a determined width substantially transverse said body defined by a distance between opposing portions of the outer surfaces thereof, wherein at least said determined width of said second connecting means is greater than said width of said second portion of said shoulder.

8. A fastener according to claim 6, wherein said first portion includes an upper surface to which said second and third portions are attached, a lower surface at spaced separation from said upper surface and on outer surface connecting said upper and lower surfaces, wherein said outer surface beginning at said upper surface and extending to said lower surface is substantially ramped in an inward direction toward said body.

9. A fastener according to claim 8 further including a grommet receiving said first connecting means for mounting of said fastener.

10. A fastener according to claim 9, wherein said grommet includes a flange, an opening within said flange receiving said first connecting means and at least one substantially flexible tab.

11. A fastener according to claim 8, where said second and third portions are each substantially elongated and generally triangular in cross-section.

12. A fastener for securing first and second panel members, each of said panel members including apertures therein for receiving said fastener, said fastener comprising:

a generally elongated body;

a shoulder attached with said body having at least first, second and third portions, with said second and third portions being at spaced separation and attached to said first portion, wherein when said fastener is in a mounted position, said second and third portions are received substantially within said aperture of the second panel member; and first and second connecting means attached with said body for securing the fastener in the apertures of the first and second panel members, wherein at least the first connecting means comprises at least two generally flexible legs, wherein each of said at least two generally flexible legs define a generally elongate member attached at a first end to said body and having a terminating end, with said terminating end being closer than said first end to said shoulder, whereby when in said mounted position, said at least two generally flexible legs are received in the aperture of the first panel member and the second connecting means is received within the aperture of the second panel member;

said fastener further comprising a grommet, wherein when in said mounted position, said grommet is received within said aperture of the first panel member, with said first portion of said shoulder being substantially received within said grommet and said at least two generally flexible legs of said first connecting means being snap-fit within said grommet.

13. The fastener according to claim 12, wherein the second and third portions of said shoulder are substantially aligned and spaced on said first portion so as to define a distance between outer surfaces thereof substantially transverse said body, wherein said first portion defines a width substantially transverse said body that is larger than said distance between said outer surfaces of said second and third portions.

14. The fastener according to claim 13, wherein said first portion includes an upper surface, a lower surface and an outer surface connecting said upper and lower surfaces, wherein said outer surface is substantially ramped in an inward direction toward said body.

15. The fastener according to claim 14 wherein said grommet includes a flange adapted for engaging an outer surface of said first panel member, an outer surface having at least one generally flexible tab adapted for engaging an inner surface of said first panel member, upper and lower surfaces at spaced separation and an opening extending through said upper and lower surfaces defining a substantially ramped inner surface, wherein said outer surface of said first portion of said shoulder substantially engages said substantially ramped inner surface of said grommet, and said at least two generally flexible legs of said first connecting means substantially engages said lower surface of said grommet.

16. The fastener according to claim 12, wherein said second connecting means comprises at least two generally flexible legs.

17. The fastener according to claim 16, wherein said at least two generally flexible legs of said first connecting means comprises means for both snapping in and snapping out of said first panel member and said at least two generally flexible legs of said second connecting means comprises means for snapping into said second panel member.

\* \* \* \* \*

UNITED STATES PATENT AND TRADEMARK OFFICE
CERTIFICATE OF CORRECTION

PATENT NO. : 6,042,296
DATED : March 28, 2000
INVENTOR(S) : J. Michael Wittig, William R. Frame, William A. Wiedmann, and Ralph Ulisse It is certified that error appears in the above-identified patent and that said Letters Patent are hereby corrected as shown below:

In claim 8, line 4, delete "on" and replace with --an--.

Signed and Sealed this

Third Day of April, 2001

Attest:

NICHOLAS P. GODICI

*Attesting Officer*  *Acting Director of the United States Patent and Trademark Office*